United States Patent
Parviainen-Jalanko et al.

(10) Patent No.: US 10,257,176 B2
(45) Date of Patent: Apr. 9, 2019

(54) REPLACING KEYS IN A COMPUTER SYSTEM

(71) Applicant: SSH Communications Security OYJ, Helsinki (FI)

(72) Inventors: Kimmo Parviainen-Jalanko, Helsinki (FI); Marko Teiste, Helsinki (FI)

(73) Assignee: SSH COMMUNICATIONS SECURITY OYJ, Helsinki (FI)

( * ) Notice: Subject to any disclaimer, the term of this patent is extended or adjusted under 35 U.S.C. 154(b) by 0 days.

(21) Appl. No.: 14/638,609

(22) Filed: Mar. 4, 2015

(65) Prior Publication Data

US 2016/0261566 A1  Sep. 8, 2016

(51) Int. Cl.
*H04L 29/06* (2006.01)
*H04W 12/04* (2009.01)

(52) U.S. Cl.
CPC ........... *H04L 63/061* (2013.01); *H04W 12/04* (2013.01)

(58) Field of Classification Search
None
See application file for complete search history.

(56) References Cited

U.S. PATENT DOCUMENTS

| | | | |
|---|---|---|---|
| 6,694,025 B1 | 2/2004 | Epstein et al. | |
| 2002/0170053 A1* | 11/2002 | Peterka | H04N 7/165 725/31 |
| 2004/0083393 A1* | 4/2004 | Jordan | H04L 63/068 726/6 |
| 2004/0249974 A1* | 12/2004 | Alkhatib | H04L 29/12349 709/245 |
| 2005/0251680 A1† | 11/2005 | Brown | |
| 2014/0056171 A1* | 2/2014 | Clegg | H04W 12/06 370/254 |
| 2014/0380055 A1† | 12/2014 | Blanchard et al. | |

* cited by examiner
† cited by third party

*Primary Examiner* — Amir Mehrmanesh
(74) *Attorney, Agent, or Firm* — Robert P. Michal, Esq.; Carter, DeLuca & Farrell LLP

(57) ABSTRACT

A first private key used by a device is replaced by a second private key, the first private key having an associated public key. The second private key is secured based on the associated public key and communicated to replace the first private key at the device. The device receives the second private key. The first private key is secured by a secret, and the device uses the secret to decrypt the first private key. The second private key is then encrypted using the decrypt first private key.

9 Claims, 3 Drawing Sheets

REPLACING KEYS IN A COMPUTER SYSTEM

FIELD OF THE INVENTION

This disclosure relates to use of keys in a computer system, and more particularly to replacement of keys.

BACKGROUND

Keys can be used in computerized systems for various purposes. An example is encryption of data communicated between computer devices and/or encryption of data stored in the system based on one or more keys. An encryption key can be seen as a piece of information that determines the functional output of a cryptographic algorithm or function, the key specifying the particular transformation between plain text and encrypt text. Without knowledge of the key the algorithm cannot produce any useful result. In addition to cryptography, other uses of keys are possible. These include use of keys for authentication and authorisation functions, digital signatures and so on. In general, keys are provided to enhance security, and hence are often called security keys. A user of keys can comprise a user of a terminal but can also be a computer system, for example an automated software application running in a computer device.

A particular example of keys are key pairs of asymmetric encryption systems. Asymmetric keys can comprise pairs of public and private keys. In these systems private and public key pairs are typically assigned for a user at an appropriate secure location. Private/public key systems are sometimes referred to as the Public Key Infrastructure (PKI). In operation, a user is assigned with a public key-private key pair. The public key can be distributed openly in the system whereas the private key is kept secret. Data encrypted based on the public key of the pair can only be decrypt by the private key, and vice versa.

Integrity of such system depends on maintaining the private keys secret. A typical arrangement is to protect the private key with a secret character string, e.g. a password or a passphrase known only to the user. The password or passphrase is communicated to the user via a secure and separate channel and the user needs to correctly input the string to activate the key. In case the user being a human being, a passphrase is typically selected and entered by the user. Original keys may also be generated by the user. In some application the passphrase is delivered to a user. The user may need to request separately for the key and/or the secret string such as the passphrase. User involvement can thus be needed to obtain a private key and/or a secret to activate a key. This can cause problems in especially in systems where automated replacement of keys is desired.

It is noted that the above discussed issues are not limited to any particular system and data processing apparatus but may occur in any system where replacement of keys may be needed.

Embodiments of the invention aim to address one or several of the above issues.

SUMMARY

In accordance with an aspect there is provided a method for replacing a first private key used by a device, wherein the first private key has an associated public key, the method comprising assigning a second private key for replacing the first private key, securing the second private key based on the associated public key, and causing communication of the secured second private key to replace the first private key at the device.

In accordance with an aspect there is provided a method of replacing a first private key at a device, the method comprising receiving at the device a second private key for replacing the first private key, wherein the second private key is secured based on a public key associated with the first private key and the first private key is secured by a secret, using the secret to decrypt the first private key, and decrypting the second private key using the decrypt first private key.

In accordance with an aspect there is provided apparatus comprising at least one processor, and at least one memory including computer program code, wherein the at least one memory and the computer program code are configured, with the at least one processor, to cause the apparatus to assign for a device with a first private key a second private key for replacing the first private key, secure the second private key based on a public key associated with the first private key, and communicate the secured second private key to replace the first private key at the device.

In accordance with yet another aspect there is provided an apparatus for a device, the apparatus comprising at least one processor, and at least one memory including computer program code, wherein the at least one memory and the computer program code are configured, with the at least one processor, to cause the device to replace a first private key by a second private key received via a network, wherein the second private key is secured based on a public key associated with the first private key and the first private key is secured by a secret, use the secret to decrypt the first private key, and decrypt the second private key using the decrypt first private key.

According to a more specific aspect a key file comprising the first private key, the associated public key, and the second private key may be generated. The key file can be communicated to the device.

The securing can comprise encrypting the second private key by means of the associated public key and/or generating a secret character string for encrypting the second private key and encrypting the secret character string by means of the associated public key.

The secured second private key can be encrypted based on the associated public key such that the encryption can only be decrypted with the first private key using a secret known by the user of the device and/or the device. The secret may comprise a passphrase or password known only by the user and/or the device.

Certain more detailed aspects are evident from the detailed description.

SUMMARY OF THE DRAWINGS

Various exemplifying embodiments of the invention are illustrated by the attached drawings. Steps and elements may be reordered, omitted, and combined to form new embodiments, and any step indicated as performed may be caused to be performed by another device or module. In the Figures.

DETAILED DESCRIPTION

Figure 1:
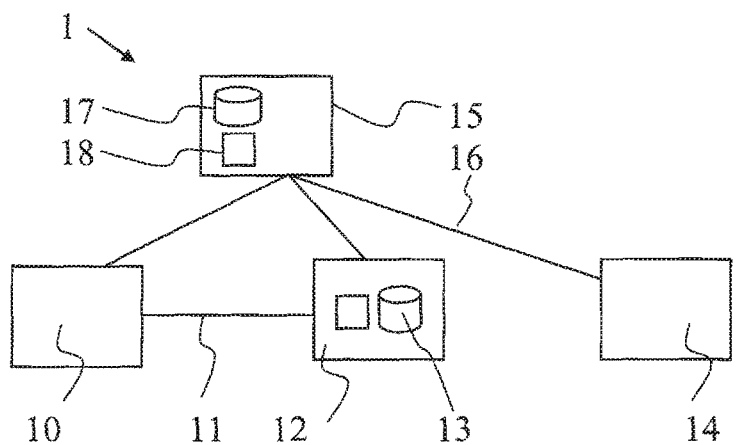
FIG. 1 illustrates an example of a computer network setup where the invention can be embodied.

FIG. 1 shows an example of a computerized system 1 where the herein described principles may be embodied. The system can be provided in e.g. an Intranet of an enterprise or similar organisation or a larger network, such as an Internet Protocol (IP) based network system. Communications between the various entities can be based on e.g. an IPv4 (Internet Protocol version 4) or IPv6 (Internet Protocol version 6). Appropriate security protocol(s) can be applied to the communications.

The exemplifying arrangement of FIG. 1 shows three computer devices 10, 12 and 14. These can be any appropriate computer devices adapted to use security keys. For example, the devices can comprise user devices such as mobile or desktop terminals, or machine type devices. A device can communicate with other devices connected to the system. Communication links are illustrated by lines 11 and 16.

Use of keys by the devices in the system 1 can be controlled by a network element, for example key manager apparatus. In FIG. 1 example a key manager apparatus 15 is configured to manage keys used by the devices 10, 12 and 14. Key manager apparatus 15 can assign and replace public key-private key pairs for users. A particular example of such a network element is Universal Key Manager™ by SSH Communications Security OYJ of Helsinki, Finland and arranged to operate in Secure Shell (SSH) based systems.

The key manager apparatus 15 is shown to comprise appropriate data processing apparatus 18 for providing functions needed for key management operations and a database 17. The database of the key manager apparatus is configured for storing information relating to keys and key management operations of users under control of the data processing apparatus. Information per user may be stored in the database in user specific key files. Each user can have a respective key management file where relevant information of keys of a given user is maintained. A user such as an administrator can interlace the key manager and give relevant key management commands thereto.

A specific key management task that may be needed from time to time is replacement of keys of individual devices. A device can have been assigned keys comprising a first private key and associated public key pair that may require replacement by a second private key and associated public key.

An existing key may need to be replaced by a new key for variety of reasons. For example, replacement of existing keys may be needed periodically for security policy reasons, in response to a predefined event or randomly. The key replacement may also be needed because of determined increased security risk caused by developments such as advancements in crypto analysis, flaws being discovered in key generation and algorithm implementations or attacks against old keys becoming more viable for some other reasons. Examples of operations where a first key is replaced by a second key include key rotation. The management operations provided by apparatus 15 can include automated replacement of existing keys at the devices.

The set-up at a device receiving a new private key can be such that private keys are protected by the device using a unique secret character string such as a password or passphrase. Thus, upon receipt of a private key the device can protect it by means of a specific secret character string known only to the user of the device before it is used. However, before the encryption by the secret string the replacement key is not protected and therefore further protection might be desired, especially for the delivery phase. The below describes examples how to protect the replacement key in an automated key replacement operation. The process described below can be transparent for the user and the user of the key does not need to be aware of the process at all. Instead, e.g. a client software in a user terminal can take care of the procedure at the user end. It is not necessary for the user to obtain and/or memorise a new passphrase since the old passphrase can be used for the new key. The process does not increase the risk of the passphrase being compromised unlike in systems where there is a need to transfer it via a side channel.

The control apparatus of the network element administering the keys can be configured to encrypt a new (second) private key replacing the old (first) private key to be delivered to a user device based on the old private key and its associated old public key. The encryption of the new key is such that to decrypt the new key the user specific secret such as passphrase or password for the old private key is needed for decryption thereof. As the secret associated with the old private key is only known by the recipient user/device, the key can be securely transferred to the device.

The control apparatus of the network element can generate a key replacement file containing information of the new key and encryption thereof based on the old public key. The encryption done using the old public key can be decrypted only by having access to the old private key in a decrypted form, and therefore the old passphrase used to encrypt the old private key is needed to open the new private key.

The key file can be stored, at least temporarily, at the memory of the network element. A replacement key can be communicated in a specific message to the particular device via communication link 16. This message can contain the key replacement file.

The recipient device can use information in the replacement key file to take the replacement key intro use. This includes decryption of the new key protected based on the old private key and the associated secret, and calculation of new public key. Also, the new private key can be encrypted using either a new user specific secret or reusing the old secret. The device can be configured to use the information received in the file and thus does not need to look for this information from elsewhere to be able to take the new key into use. This increases the efficiency of the key replacement operation. Because the user and/or user device is already aware of the secret there is no need to communicate another secret associated with the new private key to the user device. Instead, the user or user device can use the secret associated with the old private key to decrypt the new private key.

Figure 2:
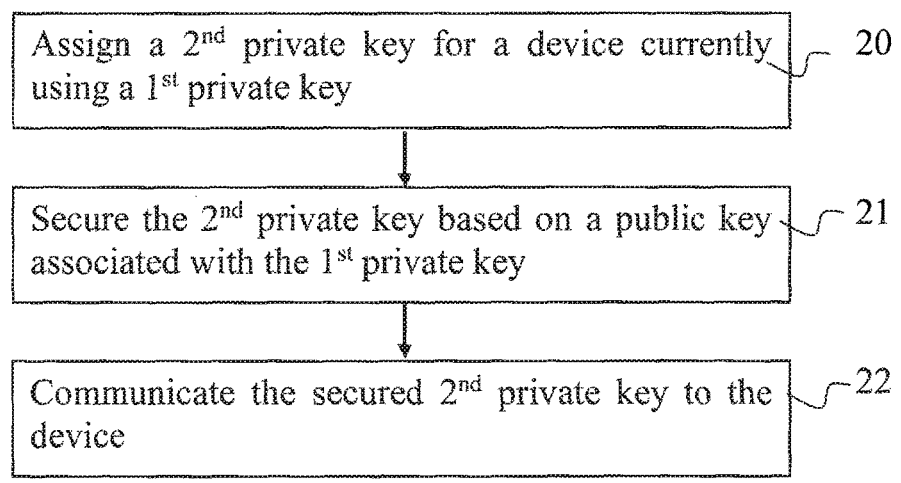
FIGS. 2, 3 and 4 show flowcharts in accordance with certain embodiments.

Operation in accordance with an example at a network element configured for replacing keys at individual user devices is shown in FIG. 2. At step 20 a network element assigns a device a second private key for replacing a first private key currently used by the device. The second private key is secured at 21 based on a public key associated with the first private key. The secured second private key is then communicated at 22 to the device to replace the first private key.

The securing may comprise encrypting the second private key with a public key associated with the first private key. The securing may also or alternatively comprise generating a secret character string for encrypting the second private key and encrypting the secret character string with the public key associated with the first private key.

The secured second private key can be encrypted based on the first public key associated with the first private key such that the encryption can only be decrypted based on a secret associated with the first private key. The secret is preferably known only by the user of the device and/or the device. The secret can comprise a character string such as a passphrase or password.

It is also possible to use a key derivation function (KDF) to derive one or more secret keys from a secret value such as a master key or other known information such as a password or passphrase using a pseudo-random function. Keyed cryptographic hash functions are examples of pseudo-random functions that may be used for key derivation. By use of a key derivation function it can be possible to encrypt a private key using a computationally cheaper method. For example, symmetric encryption can be used instead of encrypting large amounts of data with asymmetric methods which can be quite expensive.

Figure 3:
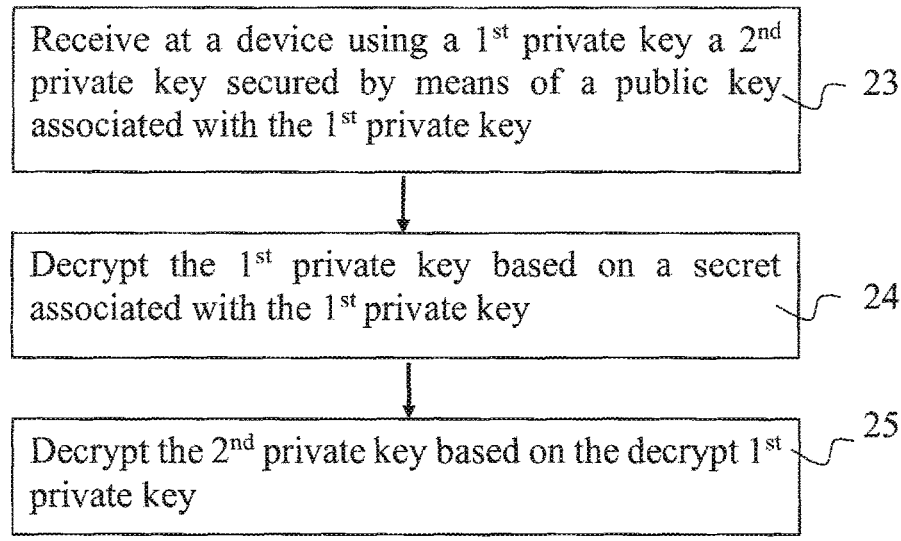

Operation in accordance with an example at a device configured for replacing a first key based on information received from a network element is shown in FIG. 3. The device receives at 23 a second private key for replacing the first private key, wherein the second private key is secured based on a public key associated with the first private key and the first private key is secured by a secret. The secret is then used at 24 to decrypt the first private key. The second private key is decrypt at 25 using the first private key decrypted at 24.

Figure 4:
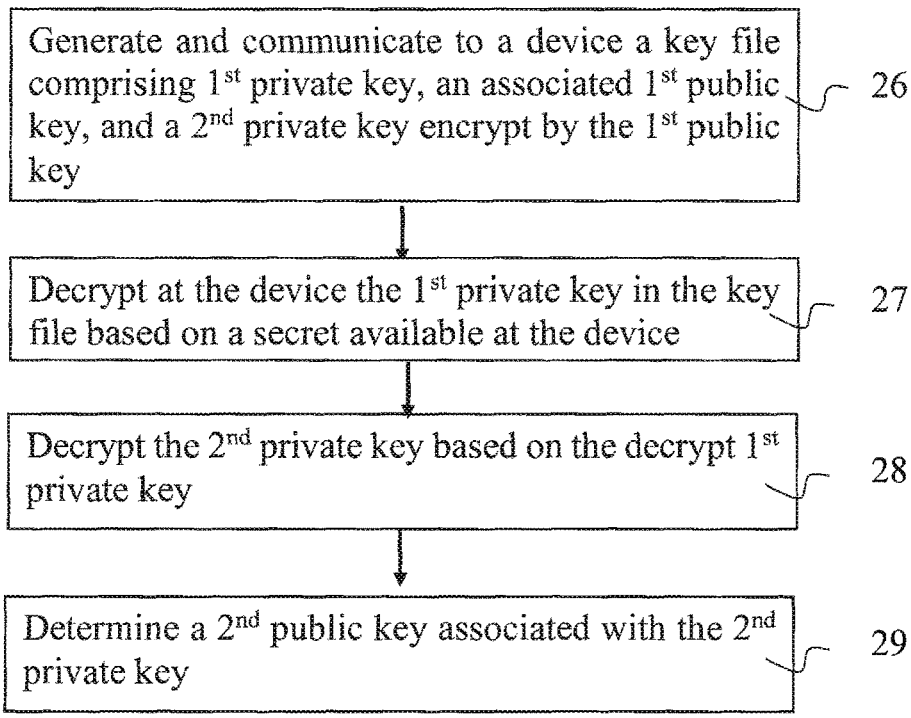

FIG. 4 shows another embodiment where a specific key file is generated and communicated at 26 from a network element to a device. The key file comprises a first private key, an associated first public key, and a second private key, the second private key being secured by means of the first public key. After the device has received key file, it decrypts at 27 the 1$^{st}$ private key by means of a secret known by the user or the device and/or the device. The second private key encrypted based on the first public key is then decrypted at 28 based on the decrypted first private key. A second public key associated with the second private key can be determined at 29.

The decrypted second private key may then be encrypted based on a secret known only by the user of the device and/or the device.

In accordance with a more specific embodiment, a key manager apparatus triggers, in response to determining it necessary to rotate a private key for a device, a key replacement operation. A new private key is generated and assigned for the device. At this stage the public key component of the old private key associated with the device can be used to encrypt the new private key. The new private key is then communicated from the key management system in a file format that facilitates automated creation of pass-phrase, password or other secret protected replacement private keys without need to prompt or provide the secret via a side channel.

According to a possibility a replacement key file can be provided by generating a random passphrase or other secret and encrypting the secret using the 'old' public key. Next time the user enters the passphrase of the old private key to decrypt the old private key, the new private key is decrypted using the old private key and again encrypted using a passphrase provided by the user and only known to him/her. The passphrases are only used and entered by the user of the keys which can be a person or a computer system. The system managing the keys does not need to be aware of the passphrases, although it can be made aware in certain applications of existence of passphrase based protection of private key files. This may be beneficial for example in order to maintain a record whether private key storage is conforming to a policy.

After encryption of the new private key the old private key can be removed from the key storage of the device.

Figures 5A, 5B, 5C:
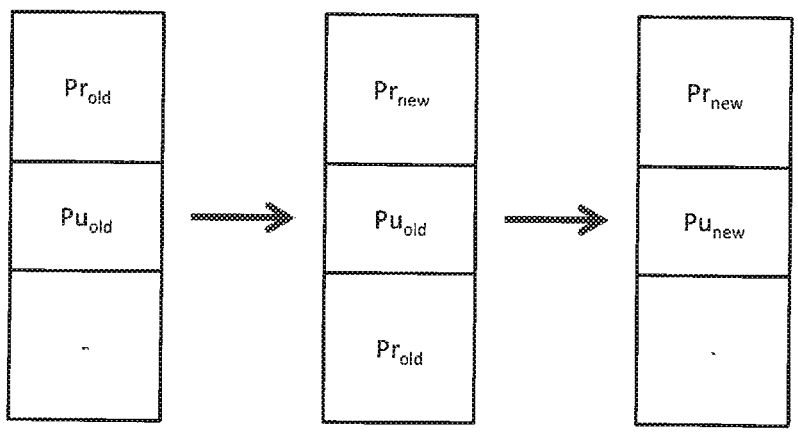
FIGS. 5A to 5C show examples of key data entities.

FIGS. 5A-C show key files for a user in three stages of an operation where a key file of FIG. 5B containing an encrypted old private key, Prold, an unencrypted old public key, Puold, corresponding to the old private key, and a new private key, Prnew, is created and used to provide replacement keys. The key file is generated at a key manager and then communicated to a device where the old keys need to be replaced by new keys.

FIG. 5A illustrates the initial stage where a user has an assigned private key-public key pair, referred herein as old keys Prold and Puold. This information is stored in a key file for the user device. FIG. 5B illustrates a replacement key file data entity generated for the device by the key manager. In the replacement key file the old private key Prold is replaced by a new private key Prnew. The new private key is in encrypted format. The key file also contains a public key which is the old public key Puold for the old private key Prold, and has been used to encrypt the new private key Prnew.

The replacement key file also comprises the old private key Prold. By having the old private key in the same file need for looking for the key from elsewhere at the rime of decryption of the new private key can be avoided. The decryption of the private new key Prnew is tied to the possession of unencrypted form of the old private key Prold. The encrypted Prold is provided in the file so that the recipient of the file in possession of the passphrase for Prold can readily decrypt the Prold and use it to decrypt the Prnew which was encrypted with the Puold related to Prold.

FIG. 5C shows a key file for the new private key-public key pair at the device after rekeying. When the user uses the key, Prold is first decrypted with a user passphrase already known by the user. Prnew encrypted by the Puold is then decrypted with the old private key Prold. A new public key, Punew, can then be calculated.

At this stage the new private key can be encrypted with a passphrase, password or other secret character string known to the user and/or recipient device. This can be the old passphrase or a new passphrase. In certain applications it is advisable to use the old passphrase as this way the whole operation can be done without need of any involvement by the end user and/or no need to memorize a new passphrase. However, a policy may mandate periodic and/or frequent passphrase changes, and mandatory passphrase change at this stage can be used to enforce such policy.

Figure 6:
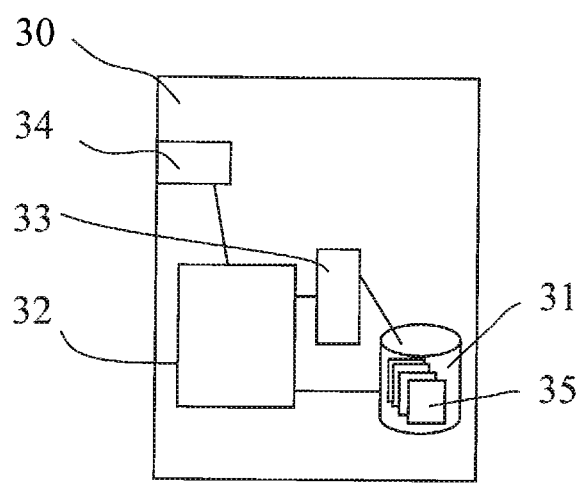
FIG. 6 shows data processing apparatus.

FIG. 6 shows an example of control apparatus for a device capable of processing the above described actions of determining need of replacement keys, generating and securely sending messages for replacing keys. Similar apparatus can be provided at a device configured to decrypt received replacement keys. The control apparatus 30 can be for example integrated with, coupled to and/or otherwise controlling the key manager 15 of FIG. 1 to provide control on use of keys or any of the devices 10, 12 and/or 14. For this purpose the control apparatus comprises at least one memory 31, at least one data processing unit 32, 33 and an input/output interface 34. The database 31 is shown to comprise therein stored key files 35. Via the interface the control apparatus can be coupled to the transport entities of the respective device. The control apparatus can be configured to execute an appropriate software code to provide the control functions. The control apparatus can also be interconnected with other control entities.

The various embodiments and their combinations or subdivisions may be implemented as methods, apparatuses, or computer program products. Methods for downloading computer program code for performing the same may also be provided. Computer program products may be stored on non-transitory computer-readable media, such as memory chips, or memory blocks implemented within the processor, magnetic media such as hard disk or floppy disks, and optical media such as for example DVD and the data variants thereof, CD, magnetic disk, or semiconductor memory. Method steps may be implemented using instructions operable to cause a computer to perform the method steps using a processor and a memory. The instructions may be stored on any computer-readable media, such as memory or non-volatile storage.

The required data processing apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. The memory or memories may be of any type suitable to the local technical environment and may be implemented using any suitable data storage technology, such as semiconductor based memory devices, magnetic memory devices and systems, optical memory devices and systems, fixed memory and removable memory.

According to an embodiment there is provided a computer program comprising code means adapted to perform, when the program is run on processor apparatus, a method for replacing a first private key used by a device, wherein the first private key has an associated public key, the method comprising assigning a second private key for replacing the first private key, securing the second private key based on the first private key and the associated public key, and causing communication of the secured second private key to replace the first private key at the device.

According to an embodiment there is provided a computer program comprising code means adapted to perform, when the program is run on processor apparatus, a method of replacing a first private key at a device, the method comprising receiving at the device a second private key for replacing the first private key, wherein the second private key is secured based on a public key associated with the first private key and the first private key is secured by a secret, using the secret to decrypt the first private key, and decrypting the second private key using the decrypt first private key.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The above described principles can be used in any system enabling key replacement process, such as centrally managed public key-private key based systems. Examples of these include secure shell (SSH) type and client certificate based systems.

The foregoing description provides by way of exemplary and non-limiting examples a full and informative description of exemplary embodiments of the invention. However, various modifications and adaptations may become apparent to those skilled in the relevant arts in view of the foregoing description, when read in conjunction with the accompanying drawings and the appended claims. All such and similar modifications of the teachings of this invention will still fall within the spirit and scope of this invention.

We claim:

1. A method for replacing a first private key of a first asymmetric pair of public and private keys used by a device, wherein the first private key has an associated public key of the first asymmetric pair of public and private keys, the method comprising:
    assigning, within a device manager server, a second private key of a second asymmetric pair of public and private keys for replacing the first private key,
    encrypting, within the device manager server, the second private key based on the associated public key of the first asymmetric pair of public and private keys, and
    delivering from the device manager server to the device, over a communication network, the encrypted second private key to replace the first private key at the device for use in communication with at least one other device,
    wherein the device is a separate and external device from the device manager server, and
    wherein the encrypted second private key is encrypted based on the associated public key of the first asymmetric pair of public and private keys such that the encryption can only be decrypted with the first private key of the first asymmetric pair of public and private keys using a secret known by the user of the device and/or the device.

2. A method according to claim 1, the method comprising: generating a key file comprising the first private key, the associated public key, and the second private key, and sending the key file to the device.

3. The method according to claim 1, further comprising: generating a secret character string for encrypting the second private key and encrypting the secret character string by means of the associated public key of the first asymmetric pair of public and private keys.

4. The method according to claim 1, wherein the secret comprises a passphrase or password known only by the user and/or the device.

5. The method according to claim 1, wherein at least one of: the first private key and the second private key comprise private keys for one of authentication, authorization and digital signature, and the second private key is different from the first private key.

6. An apparatus comprising at least one processor, and at least one memory including computer program code, wherein the at least one memory and the computer program code are configured, with the at least one processor, to cause the apparatus to:
    assign, within a device manager server, for a device with a first private key of a first asymmetric pair of public and private keys a second private key of a second asymmetric pair of public and private keys for replacing the first private key,
    encrypt, within the device manager server, the second private key based on a public key associated with the first private key, deliver from the device manager server to the device, over a communication network, the encrypted second private key to replace the first private key at the device for use in communication with at least one other device, and configured to generate a secret character string for encrypting the second private key of the second asymmetric pair of public and private keys and encrypt the secret character string by means of the associated public key of the first asymmetric pair of public and private keys, wherein the device is a separate and external device from the device manager server.

7. The apparatus according to claim 6, further configured to generate a key file comprising the first private key, the associated public key, and the second private key, and communicate the key file to the device.

8. The apparatus according to claim 6, configured to secure the second private key based on the associated public key of the first asymmetric pair of public and private keys such that decryption of the second private with the first private key requires use of a secret known by the user of the device and/or the device.

9. The apparatus according to claim 6, wherein at least one of: the first private key and the second private key comprise private keys for one of authentication, authorization and digital signature, and the second private key is different from the first private key.

* * * * *